United States Patent
Iliadis et al.

(10) Patent No.: US 6,322,694 B1
(45) Date of Patent: Nov. 27, 2001

(54) MACHINE COOLANT MANAGEMENT SYSTEM

(75) Inventors: Nick Iliadis, Buffalo Grove; William L. Jacoby, South Elgin; Brian Porter, Lyons, all of IL (US)

(73) Assignee: Safety-Kleen Systems, Inc., Columbia, SC (US)

( * ) Notice: Subject to any disclaimer, the term of this patent is extended or adjusted under 35 U.S.C. 154(b) by 0 days.

(21) Appl. No.: 09/649,832

(22) Filed: Aug. 29, 2000

(51) Int. Cl.[7] ............................ B01D 17/02; B01D 27/06
(52) U.S. Cl. .................. 210/167; 210/171; 210/172; 210/253; 210/257.1; 210/258; 210/242.3; 210/336; 210/538
(58) Field of Search ..................................... 210/167, 168, 210/171, 172, 195.1, 196, 197, 253, 254, 257.1, 258, 259, 299, 416.5, 336, 538, 540, 122, 242.1, 242.3

(56) References Cited

U.S. PATENT DOCUMENTS

| | | | |
|---|---|---|---|
| 654,965 | * 7/1900 | Franke | 210/540 |
| 3,540,588 | 11/1970 | Estabrook . | |
| 4,361,488 | 11/1982 | White et al. . | |
| 4,366,069 | 12/1982 | Dudrey et al. . | |
| 4,521,313 | 6/1985 | Wolde-Michael . | |
| 4,892,666 | * 1/1990 | Paulson | 210/242.3 |
| 5,059,312 | * 10/1991 | Galletti | 210/172 |
| 5,143,603 | * 9/1992 | Gibbs | 210/122 |
| 5,160,605 | 11/1992 | Noestheden . | |
| 5,236,585 | * 8/1993 | Fink | 210/259 |
| 5,244,586 | 9/1993 | Hawkins et al. . | |
| 5,451,330 | * 9/1995 | Garrett | 210/540 |
| 5,454,937 | * 10/1995 | Lewandowski | 210/171 |
| 5,478,465 | 12/1995 | Larson et al. . | |
| 5,492,619 | 2/1996 | Batten . | |
| 5,514,266 | 5/1996 | O'Brien et al. . | |
| 5,593,596 | 1/1997 | Bratten . | |
| 5,599,457 | 2/1997 | Fanning et al. . | |
| 5,601,705 | * 2/1997 | Glasgow | 210/242.3 |
| 5,622,627 | 4/1997 | Fanning et al. . | |
| 5,948,244 | * 9/1999 | Fortier | 210/171 |
| 5,948,274 | 9/1999 | Lyon et al. . | |
| 5,972,209 | * 10/1999 | Shih | 210/171 |
| 6,004,470 | * 12/1999 | Abril | 210/171 |

* cited by examiner

Primary Examiner—Christopher Upton
(74) Attorney, Agent, or Firm—Vedder Price Kaufman & Kammholz

(57) ABSTRACT

An apparatus for removing floating and subsurface contaminants from a machine tool coolant bath is disclosed. The apparatus comprises a floating skimmer for collecting floating contaminants from the surface of the bath connected to an oil trap having an imperforate shell with a fluid tight column extending below the interface. A return conduit and a positive displacement pump are in series with the skimmer and oil trap. A submersible pump is disposed in the bath near the bottom for collection of water and water density contaminants and is connected to a remote filter assembly having a housing and a removable filter element. The filter assembly and the oil trap are both accessible without affecting the operation of the machine.

18 Claims, 4 Drawing Sheets

MACHINE COOLANT MANAGEMENT SYSTEM

BACKGROUND OF THE INVENTION

The present invention relates generally to metal working fluid or machine coolant management systems, and more particularly, to a system which includes components that are capable of being placed in the working fluid as a unit for purposes of selective withdrawal of the fluid and separation of its contaminants. The unit is useful primarily with so-called machining centers, but also with parts washers and other forms of apparatus which use water as their process fluids.

The term "coolant" is intended to be an all-inclusive term, which includes water, any number of emulsifying agents, cutting oils and lubricants of various kinds, additives, and impurities created by cutting, drilling or other machining operations, including grinding or abrasive metal reduction. The term also includes fluids not strictly used for cooling but which are nonetheless subject to oil/water separation, such as those used in aqueous-based parts washers. For purposes of illustration, however, the description herein is primarily directed to machining centers.

In the preferred form, a floating skimmer and feed pump are placed in the user's machine sump and are able to transport oil and contaminant-laden coolant to the treatment elements. The remainder of the elements making up the system are preferably contained in a unified housing to simplify their installation or placement and, very importantly, to ease the burden of periodically servicing the machine. The servicing, of course, is carried out by a contractor who specializes in these and similar products.

In the preferred form, the unified components contained in a housing are removable and, replaceable, if need be, as a unit, and the components which are used in the machine coolant tank may be removed therefrom without in any way disturbing the integrity of the machining operation.

Preferably, the system contains both a floating contaminant removal device, termed a "skimmer", and a submersible pump, each with its own impurity or contaminant removal system. The coolant liquid itself is continuously recirculated, preferably by means of a centrifugal pump and fed through a low-pressure-drop filter. Once the process fluid has passed through this filter, the liquid is returned in a substantially particulate-free condition to the coolant bath. At the same time, the oils and other lighter-than-water contaminants are picked up from the top surface of the coolant by a floating skimmer of a novel design, and directed via suitable tubing through an oil trap of a novel design, through a filter, and finally, through a positive displacement pump before being returned in a substantially oil-free condition to the coolant bath. The oil trap removes tramp oil, floating solids, and other non-emulsified, lighter-than-coolant impurities.

The system is designed to clean and maintain a coolant system which is primarily water, but also contains, in most cases in emulsion form, a lubricant for the machine, and various surface active agents which maintain the oil-water emulsion and prevent corrosion. There may be other components whose identity will vary somewhat with the application and the details of whose composition is not particularly relevant to the present invention.

An advantage of the present invention is that it gives an outside contractor or supplier the ability periodically to service the separate apparatus without disturbing the principal machine, or compromising its operation. Thus, service may be performed by removing the oil from the trap or separator and removing the used filter element. This is accomplished merely by disconnecting the electrical power supply to the pump and disconnecting the fluid conduits leading to the coolant management system. Then, the housing is serviced by replacing the filter element and collecting the separated oil from the oil trap. In this way, the customer's principal machine need undergo no significant down time, or no down time at all. Most or all of the maintenance can be performed without stopping the machine.

The skimmer and the hose connecting it to the remainder of the apparatus may be simply serviced or replaced, because the skimmer has no moving parts and only one adjustable part, that is one which may be adjusted simply by turning the insert to adjust the skim gap. Likewise, the centrifugal, submersible feed pump may be removed and replaced, if necessary, since this unit itself contains only a strainer and includes minimal, self-contained moving parts. It is preferably a pump that may be adjusted to a desired depth, but is otherwise modular and removable. The depths to which the unit may be submerged are varied for example simply by changing the position of the hanger bracket.

In a preferred form, a single, preferably plastic outer container contains the oil trap, the small positive displacement pump filter, and the positive displacement pump itself, as well as the so-called "cross flow" filter and its connecting lines.

The construction of the oil trap is such that a generally non-emulsified oil-water mixture enters the trap manifold and the liquid phase is directed downwardly well past the middle of the trap. As the oil coalesces, it floats to the top and forms several layers, an air layer, an oil layer, an emulsified layer, a lowermost water layer and of course a sludge layer resting on the bottom. Accordingly, the water phase lies adjacent the bottom of the oil trap housing. The plates on the return tube prevent turbulence and thus help with separation of water and allow the water to pass up inside the return tube. The return tube has a connection to the positive displacement pump, and also is in communication with the air in the air-tight manifold. The oil accumulates below the manifold portion of the oil trap. The water passes from near the bottom to the return tube and hence is substantially oil-free. A strainer and a screen comprise the filter protecting the suction pump from impurities on this portion of the apparatus.

The positive displacement pump is preferably a bellows- or diaphragm-type pump which is operated by a cam, and functions at a relatively low flow rate. A bellows- or diaphragm-type pump is selected because of its self-priming capability. Preferably, the rate of the flow of the oil pump is selected so as to allow an appropriate residence time for oil and water separation within the oil trap. Additionally, a positive displacement pump provides low shear forces. The centrifugal pump is a submersible type which operates with a relatively small pressure head and supplies coolant, suspended solids, including particles and contaminants, to the filter.

The makeup of this type of filter is best shown in U.S. Pat. No. 5,478,465, wherein two sleeves, each having tortuous flow paths, are interconnected to an outside manifold outlet which allows the coolant to enter the return line after the coolant has been filtered. All of the coolant emerges from the filters, and this arrangement of the filter permits the filter not to be "blinded" or to lose its capacity to filter although part or even most of it may be eventually clogged during operation.

A bypass opening on the filter may permit flow to continue in the event of clogging, thereby protecting the pump from becoming partially or fully clogged during operation.

In view of the failure of the prior art to provide a simple, integrated cost-effective, low pressure, very serviceable and low maintenance integrated system for liquids, including managing coolant used in cutting, drilling, grinding or other machining operations, it is an object of the present invention to provide such an integrated system.

It is another object of the invention to provide a coolant management system, which, except for the pickup and discharge elements, lies entirely outside the principal apparatus, and hence is independent of such apparatus.

Yet another object of the invention is to provide a coolant treating system which will both pick up coolant and suspended solid components and pass such components through a suitable filter, as well as a floating pickup unit including a novel skimmer for processing lighter than water components, including oil and the like.

Still another object of the invention is to provide an apparatus which includes units for purifying a water-oil emulsion emanating from both immersed and surface sources.

A further object of the invention is to provide an apparatus using appropriate, different style pumps, preferably one centrifugal and one positive displacement pump, for scavenging different contaminants in a liquid from the same coolant bath.

A still further object of the invention is to provide a one-piece container for two elements, preferably cylindrical elements, respectively containing an oil trap and a suspended particles filter.

An additional object of the invention is to provide pumps in an apparatus, which are operable by ordinary, plug-in low voltage shop current available in any locations.

A still further object of the invention is to provide an apparatus wherein the periodic servicing may be carried out in a matter of minutes, which is due to the arrangement of components.

Another object of the invention is to provide a filter and oil trap separators which may be serviced and/or removed and replaced by a service organization without materially disturbing the operation of the customer's principal system/ machine.

Another object of the invention is to provide an oil trap with a three-way air bypass, including a bleed hole for return air.

A still further object of the invention is to provide a skimmer device having a readily and easily adjustable skim gap, so that the skimmer will be less sensitive to temperature changes in the bath, and also to accommodate slight changes in fluid density.

An additional object of the invention is to provide a return tube having two concentric plates on it to help phase separation and prevent re-emulsification, thereby permitting substantially only water to enter the return tube.

SUMMARY OF THE INVENTION

The present invention achieves its objects and others by providing a single apparatus with both a filter for particulates or particles and an oil trap unit, as well as two pumps and connections therefor, and which is readily detachable from the supply lines for a floating skimmer and a submersible centrifugal pump, whereby a readily serviceable device is provided.

The manner in which the foregoing objects and advantages are achieved in practice will become more apparent when considered in connection with the detailed description of the preferred embodiment of the invention set forth by way of example and shown in the accompanying drawings wherein like reference numerals indicate corresponding parts throughout.

DESCRIPTION OF THE PREFERRED EMBODIMENTS OF THE INVENTION

Although the present invention may be embodied in a number of different forms and the elements may be arranged in different configurations, a preferred embodiment of one form of the invention is shown. Other embodiments or arrangements of components will be apparent to those skilled in the art, and such changes or modifications may be made without departing from the scope of the invention.

Figure 1:
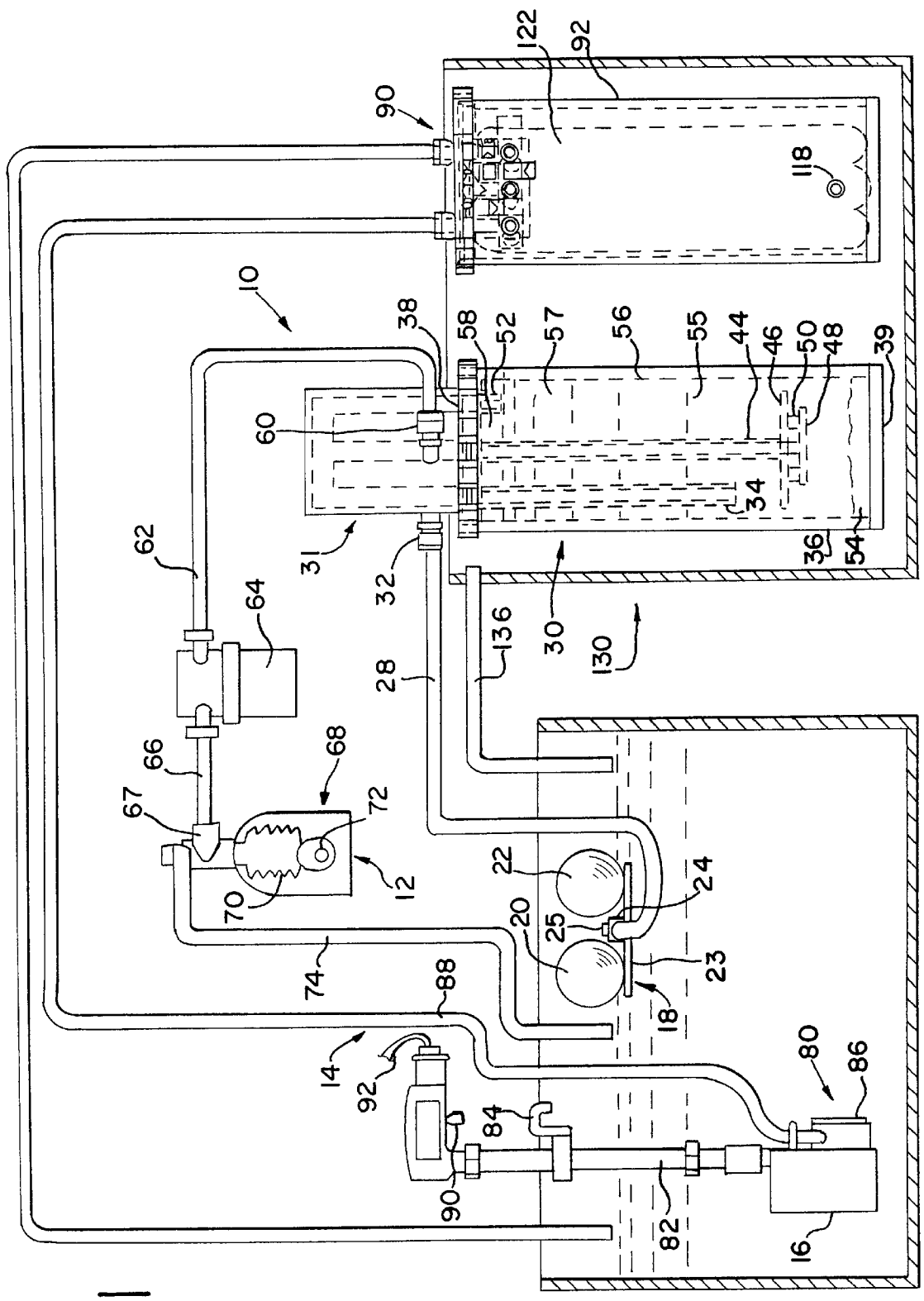
FIG. 1 is a view, largely schematic, showing the major elements of the coolant management system of the present invention.

Referring now to the drawings in greater detail, there is shown in FIG. 1 a schematic view of most of the principal elements of the invention. These include a pair of systems for recirculating and filtering the coolant generally designated 10. There are two principal assemblies in the coolant recirculation system, namely, a surface feed system generally designated 12, which feeds the floating oil and other floating contaminants from atop the coolant bath, and a subsurface feed system generally designated 14 which operates to circulate the coolant from a region near the bottom of the coolant tank 16. The components of the oily feed solution include a skimmer generally designated 18, and shown to include three or four floats in the form of hollow stainless steel balls 20, 22, (FIGS. 1 & 2), a skimmer frame unit 23 (FIGS. 1 & 5), a body 24 including a threaded portion 25 which accommodates a specially designed insert generally designated 27 whose construction will be explained in detail herein. Moreover, a hose 28 is attached to the body 24. This hose 28 is in part submerged and partially above the liquid level. The inlet 26 is designed to be readily adjustable so as to skim the surface to a desired extent and remove floating oil and a certain amount of water.

Figure 2:
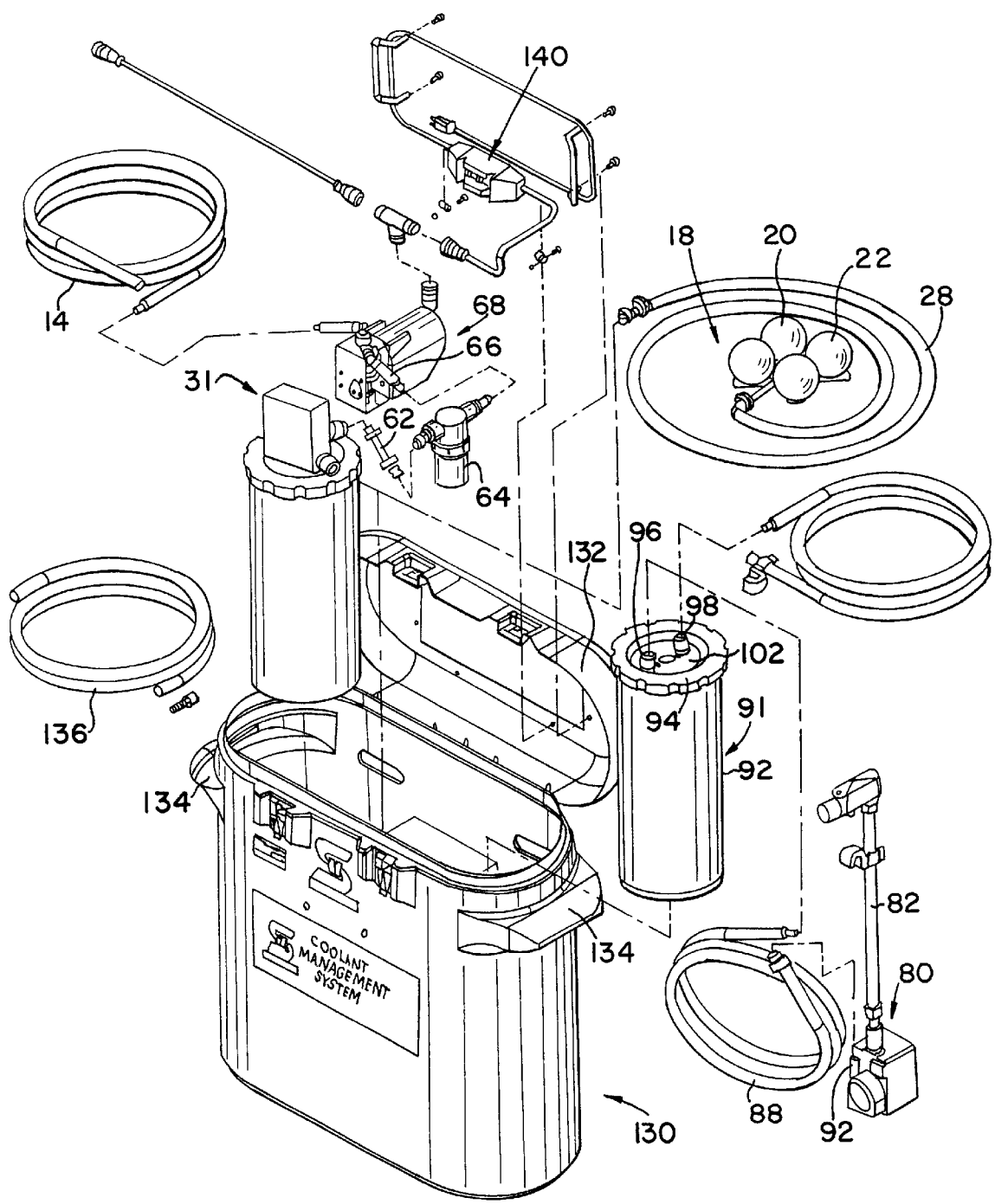
FIG. 2 is a perspective view of the various components of the present invention and the secondary containment vessel in which they are received, and showing the components in exploded relation to one another.

These floating contaminants are removed via the hose 28 and fed to an oil trap generally designated 30 (FIGS. 1 & 2). The oil trap 30 includes a quick-disconnect inlet fitting 32 which is branched so as to be connected to a downwardly extending inlet tube 34 on the inside of the cylindrical oil trap housing 36, an imperforate cylinder closed off by a top locking member generally designated 38 and sealed at the bottom by an integral member 39. The inlet tube 34 extends downwardly into the trap housing 36 and terminates an inch or two above the top of the upper parallel plate 46. The inlet tube 34 allows the water-oil mixture to be directed to the housing interior in a manner which is described elsewhere herein.

The oil trap 30 includes a hollow outlet or return tube 44 which extends significantly below the inlet tube 34, and terminates in an upper imperforate, relatively larger diameter separator plate 46 having a central opening therein for the communication with the return tube 40. A lower plate 48 is kept separate from the upper plate 46 by a plurality of spacers 50. The bottom plate is preferably totally imperforate.

A hollow by-pass tube 52 (FIGS. 1 & 4) extends down into the cylinder a slight distance, approximately 1" to 2". This tube 52 importantly includes a bleed hole 53 therein. When the apparatus is in use, the liquid level in the interior of the cylinder 36 comprises a somewhat small sludge layer 54 on the lowermost surface, a less dense water layer 55 which occupies a middle portion of the cylinder and is in turn surmounted by a less dense emulsion layer 56, which generally floats on the top of the water and an oil layer 57, and finally a froth layer 58, which is principally air, lies at the very top of the liquid level in the separator or oil trap 30. The oil trap 30 is effective until the oil level extends down near the bottom of the return tube 44. Additional details of the function of the oil trap 30 will be set forth herein.

A quick disconnect fitting 60 is connected to a return line 62 for the liquid in the water layer which in turn enters a filter assembly 64, and from there to a filter outlet line 66. The filter outlet line 66 communicates with the inlet 67 of a positive displacement pump generally designated 68. A ball check valve, a diaphragm valve, duckbill valve, or the like is suitably connected to control flow through the pump 68. In this case, a bellows 70, driven by a cam 72, functions to expel the liquid, which has been purified by passing through the filter 64, through the hose 74 and back to the machine sump 16.

The provision of a positive displacement pump is preferred, and this type of pump could be the cam and bellows type arrangement shown, it could be a diaphragm pump, or other suitable pump. The object of this type of pump is to create positive suction without undue turbulence, which would tend to unsettle the layer of oil which has been separated by the oil trap unit 30.

Referring now to the so-called liquid feed system as a whole, this comprises a submersible, centrifugal pump generally designated 80, having a flexible standpipe 82 fitted with a clamp 84 which is adjustable on the flexible standpipe 82 to vary the depth at which the pump 80 is disposed. The inlet of the pump 86 is at the bottom or sides through a screen, and from there, the low pressure output is directed to a conduit 88 through which the fluid is pumped.

Figure 3:
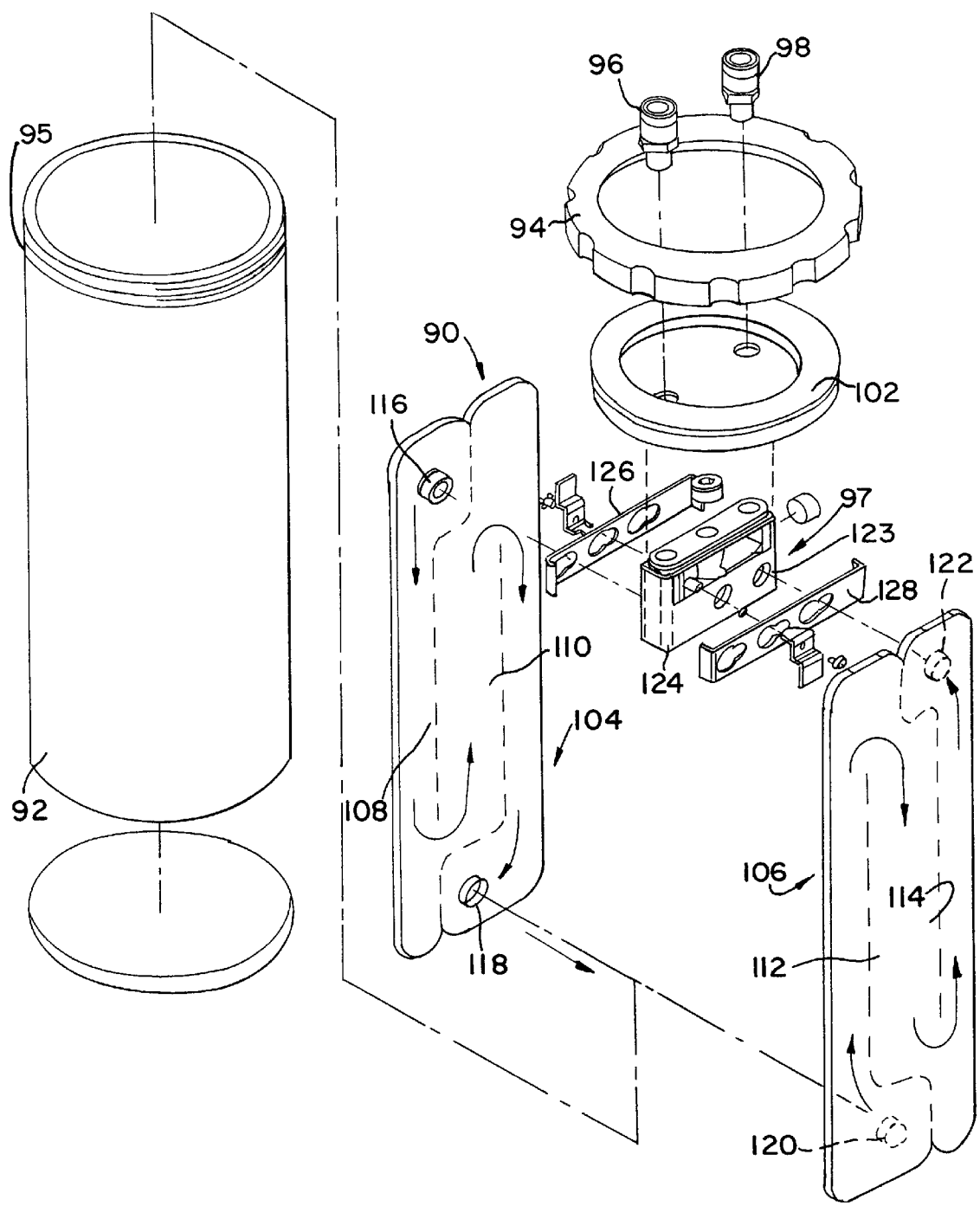
FIG. 3 is an exploded view, showing the filter housing and details of the filter housing and details of the filter bags, manifold and connections to the housing.

The unit further includes a switch 90 and a connection 92 for wires or the like, which wires extend down the standpipe 82. The conduit 88 leads to a filter assembly generally designated 91, which contains a pair of labyrinth, very low restriction type filter elements. The filter elements are contained within a filter housing 92 fitted with a threaded top fastening ring, as best shown in FIG. 3. FIG. 3 shows that the filter unit includes a cover assembly 102 held in place by the ring 94, when the ring is screwed in place by engaging the threads 95 on the housing 92. Also included in the cover assembly are a quick disconnect inlet fitting 96, and a similar outlet fitting 98. The manifold generally designated 97 is welded to and hence integral with the cover assembly 102.

The filter unit 90 itself includes first and second filter elements or bags generally designated 104, 106. Each of the bags includes a heat seal line or formation 108, 110, 112, 114 which serves to keep a labyrinthine path for the flow of liquid shown by the arrows in FIG. 3. The flow of liquid first enters the fitting 116 from the manifold 124 and then passes through the filter according to the directional arrows shown and finally exits at the fitting 118 at the bottom of the filter bag 104. This fitting 118 is in turn attached to the inlet fitting 120 at the bottom of the second filter bag 106. Here, the fluid follows the path of the arrows, finally ending up at the end in a blind passage 123.

The fittings are registered with a manifold 124 to which the fittings 116, 122 of the two filter bags are received and preferably held by slidable clips 126, 128. The clips slide from right to left as shown in the drawings when the bags are in place. The manifold 124 includes passages for directing the fluid from the inlet 96 and to the outlet 98 which takes fluid that lies outside the filter bags 104, 106.

The provision of the clips 126, 128 permits ready removal of the filter bags when it comes time to service the filter bags.

An important feature of the present invention is that the system may be installed on a customer machine and may be removed and/or serviced easily. The components are capable of being assembled and placed in a secondary containment kit 130 which is shown in FIG. 2. The oil trap assembly is generally designated 30 and the filter unit is generally designated 90; both are housed in the secondary containment vessel 130, which is leakproof. As a precaution, an overflow line 136 is provided.

The secondary containment vessel 130 and a cover 132 are the most convenient way to integrate the oil trap 30 and the filter housing 90. An integral pair of handles 134 serve to grip the vessel 130 wherein the components are received. The return line 74 is shown as being attachable to the pump generally designated 68, and the pump inlet is attached by the line 66 to the stainer and filter unit 64. A connection 62 is also shown and this unit takes mostly liquid water from the oil trap 30, by way of the fitting 60.

The suction tube 28 supplies the inlet 32 in the top portion 33 of the housing and is fed by the skimmer 18. An electrical connection generally designated 140 is shown for energizing the pump and this is believed self-explanatory. The electrical cords, etc. are contained on the top of the secondary containment vessel 130, 132.

The submersible pump generally designated 80 is shown, and this includes the adjustable clamping hanger 84 and the electrical current supply 91. The outlet 92 of the pump connects to the hose 88 which is shown in coiled form. The flexible standpipe 82 forms a support for the submersible pump 80 and also carries the electrical connections to operate the pump.

The construction and arrangement of the filters is shown with greater particularity in U.S. Pat. No. 5,478,465, and in particular, in FIGS. 5, 9 and 9A thereof.

In use, the apparatus of the invention is very simple. The installer determines the depth to which the submersible pump should be placed, and adjusts the height of clamp 84 on the standpipe accordingly. The hose connections are all made according to the scheme shown in the drawings. The skimmer 18 is placed in the bath and the skimmer inlet 26 will ordinarily be at or near the correct level. If not, a slight adjustment may be made to it.

Figure 5:
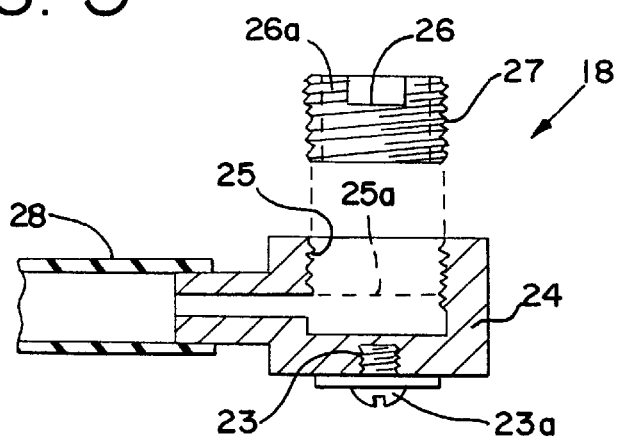

Referring now to the construction of the skimmer, and in particular to FIG. 5 of the drawings, there is shown a skimmer incorporating various desirable features of the invention. The skimmer 18 includes a body 24 which is secured to the floats by one or more cross members 23 which are fastened to the body 24 by a fastener 23a. The body 24 includes a vertical passage 25a which is internally threaded as at 25. The threaded passage 25 accommodates counterpart threads 27 on the outside of an adjustable insert 26a. The insert 26a includes an opening 26 in the form of a rectangular cut out in the insert sleeve 26a.

A significant feature of the apparatus is that the skim gap may thus be adjusted merely by having rotating the insert sleeve 26a, using the threads 27 to adjust its position in the body 24. Thus, according to the depth of the insertion, the skim gap may be varied from very slight to considerable merely by rotating the insert sleeve, which can be done simply by hand.

The pump shown is of the bellows type, which requires no priming. It is operable to withdraw oil and other floating contaminants, and a certain amount of surface water, as well as air, from the bath. The oil trap operates merely by having the inlet tube 34 appropriately positioned and allowing the sludge 54 to sink to the bottom, while the oil rises to the top. The water takes on a varying depth until the oil/water interface approaches the upper plate 46 of the return tube 44.

Figure 4:
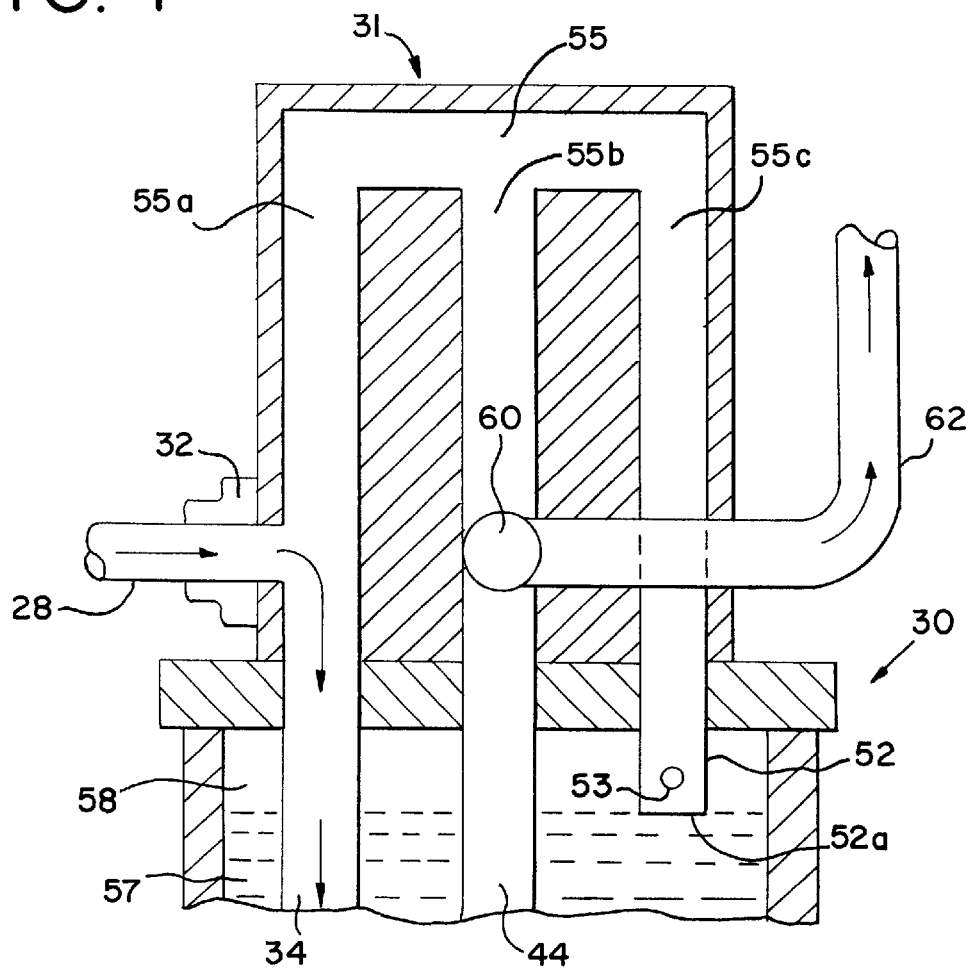
FIG. 4 is a greatly enlarged fragmentary view of the upper manifold portion of the oil trap, showing details of an interconnect system including a bleed hole in the stub air return and other details of the oil trap; and, FIG. 5 is a greatly enlarged view of a portion of the readily adjustable skimmer inlet of the invention.

Referring now to FIG. 1 and particularly FIG. 4, additional details of the upper or cover portion 31 of the oil trap 30 are shown. This cover unit 31 includes plural internal passages, including an inlet passage 32 and an outlet passage 60, communicating with the line 62. The top cover 31 includes the inlet tube 34, the return tube 44 and a stub tube 52. The stub tube thus lies in the usually frothy layer 58 above the oil layer 57 in the housing 30. The stub tube 52 importantly includes a small bleed opening 53 that extends transversely of the tube 52. In other words, the bleed opening 53 extends through the vertical side wall of the tube 52 and permits air flow into the passage 55c which in turn communicates with the passage 55. The passage hence communicates with the three passages 55a, 55b and 55c. These passages, in other words, all communicate with each other and are normally filled with air, whereas the tube 62 draws out mostly water, and some air, from the oil separator. When oil and water enter the tube 28, they then pass through the fitting 32 and into the interior of the oil trap 30. The heavy water and oil mixture thus move to the bottom while any entrained air passes upwardly through the opening 55a. The water that is taken from the return tube 44 to the outlet tube 62 may contain small amounts of air which enter the common passage 55 from the stub tube 52. In order to avoid sudden filling and emptying of the tube 52, with the resulting surges, the small bleed hole 53 above the lower extent of the tube 52 allows the air to come to rest at the top of the layer 57 to be bled continuously to the passage 55c, and thus helps maintain the level at the interface 52a of the tube 52 and the liquid 57.

The filter is able to remove a great deal of the suspended contaminants, and these are received within the two bags or elements, while the filtrate is contained in the filter housing 90. When the unit requires service, depending on the type, the entire unit may be removed and replaced with a new one, or, more preferably, the clips 126, 128 may be manipulated so as to remove the filter bags 104, 106. Then, new bags 104, 106 are merely placed within the housing and attached to the manifold 124 by the clips 126, 128. The screw top ring 94 is then replaced over the top of the cover 102.

It will thus be seen that the present invention provides a simplified, integrated system for removing floating and suspended contaminants from a customer machine, all requiring no down time for service or replacement, having a number of advantages and characteristics including those expressly pointed out here, and others which are inherent in the invention. An illustrative embodiment of the product of the invention having been shown and described, it is anticipated that variations to the described form of apparatus will occur to those skilled in the art and that such modifications and changes may be made without departing from the spirit of the invention, or the scope of the appended claims.

What is claimed is:

1. An apparatus for removing both floating contaminants and subsurface contaminants from an oil-containing coolant bath associated with a given machine, said apparatus comprising, in combination, a floating skimmer for picking up floating contaminants and water from the upper surface of said coolant bath, and an oil trap, an inlet conduit for connecting said skimmer to said oil trap, and a conduit for return of said liquid to said coolant bath, a positive displacement pump in series with said conduits and said oil trap, said oil trap having an imperforate exterior shell and an inlet and an outlet, and including an interior, fluid-tight column extending substantially below the interface between said oil and water in said oil trap, said column communicating at its upper end with said oil trap outlet, said apparatus further comprising a submersible pump disposed in said coolant bath near the bottom thereof and adapted to transfer water and generally water density contaminants therefrom to a remote filter assembly, said filter assembly including an imperforate exterior housing, a filter inlet and a filter outlet and at least one removable filter element disposed between said filter inlet and said filter outlet, said element presenting a large surface area in relation to the volume of said housing, said oil trap and said filter assembly both being accessible for removal of said at least one filter element and for disposing of said oil in said oil trap without affecting the operation of said machine.

2. An apparatus as defined in claim 1, wherein said floating skimmer contains at least two floats in the form of balls and includes a body disposed between said floats, said body having an opening and a passage therein and being adapted to take in water and other contaminants from the surface of said liquid.

3. An apparatus as defined in claim 2, wherein said body includes a vertically extending sleeve portion having a cutout in the upper periphery thereof, said sleeve including a hollow interior communicating with said passage, said cutout comprising less than half the circumference of said sleeve, said sleeve being vertically movable in relation to the remainder of said body by reason of having threads on the exterior surface thereof, said threads being adapted to engage corresponding threads on the interior surface of said body.

4. An apparatus as defined in claim 3, wherein said cutout is a rectangular cutout.

5. An apparatus as defined in claim 1, which further includes a pump filter in series with one of said conduits and said oil trap.

6. An apparatus as defined in claim 5, wherein said pump is located downstream of said oil trap.

7. An apparatus as defined in claim 1, wherein said positive displacement pump includes a bellows-type member actuated by a cam for periodically drawing fluid from said oil trap.

8. An apparatus as defined in claim 1, wherein said oil trap includes a cover member, said cover member having at least a portion lying above the normal liquid level in said trap, said cover member being airtight and having an upwardly extending passage in communication with said fluid inlet, an upwardly extending passage in communication with said fluid outlet, and a third, upwardly extending passage in communication with a stub tube extending downwardly of said portion and terminating adjacent said liquid level in said trap, said three passages also being in communication with a fourth common passage and hence with one another.

9. An apparatus as defined in claim 8, wherein said stub tube includes at least one bleed hole lying below said cover portion therein for permitting bleed air to enter said enclosed region including said inlet and outlet passages and said common passage.

10. An apparatus as defined in claim 1, wherein said filter assembly includes at least two removable filter elements, said filter elements including means defining a labyrinthine path for a liquid flow therethrough.

11. An apparatus as defined in claim 1, wherein said return tube includes at least two horizontally extending, vertically spaced apart plates, said return tube having an opening extending through said upper plate, said plates being disposed near but slightly above the bottom of said oil trap.

12. An apparatus as defined in claim 11, wherein said inlet to said oil trap includes an inlet tube extending substantially downwardly in said oil trap but lying above said plates on said return tube.

13. An apparatus as defined in claim 1, wherein both said oil trap and said filter assembly are contained within a single fluid-tight secondary containment vessel.

14. An apparatus as defined in claim 13, wherein said secondary containment vessel is fluid-tight, said secondary containment vessel including an overflow tube directed back to said coolant bath.

15. An apparatus for removing both floating contaminants and subsurface contaminants from an oil-containing coolant bath associated with a given machine, said apparatus comprising, in combination, a floating skimmer for picking up floating contaminants and water from the upper surface of said coolant bath, and an oil trap, an inlet conduit for connecting said skimmer to said oil trap, and a conduit for return of said liquid to said coolant bath, a positive displacement pump in series with said conduits and said oil trap, said oil trap having an imperforate exterior shell and an inlet and an outlet, and including an interior, fluid-tight column extending substantially below the interface between said oil and water in said oil trap, said column communicating at its upper end with said oil trap outlet, said oil trap including a cover member, said cover member having at least a portion lying above the normal liquid level in said trap, said cover member being airtight and having an upwardly extending passage in communication with said fluid inlet, an upwardly extending passage in communication with said fluid outlet, and a third, upwardly extending passage in communication with a stub tube extending downwardly of said portion and terminating adjacent said liquid level in said trap, said three passages also being in communication with a fourth common passage and hence with one another, said apparatus further comprising a submersible pump disposed in said coolant bath near the bottom thereof and adapted to transfer water and generally water density contaminants therefrom to a remote filter assembly, said filter assembly including an imperforate exterior housing, a filter inlet and a filter outlet and at least one removable filter element disposed between said filter inlet and said filter outlet.

16. An apparatus as defined in claim 15, wherein said return tube includes at least two horizontally extending, vertically spaced apart plates, said return tube having an opening extending through said upper plate, said plates being disposed near but slightly above the bottom of said oil trap, said oil trap further including an inlet pipe extending downwardly from said inlet tube but not below said plates.

17. An apparatus for removing both floating contaminants and subsurface contaminants from an oil-containing coolant bath associated with a given machine, said apparatus comprising, in combination, a floating skimmer for picking up floating contaminants and water from the upper surface of said coolant bath, and an oil trap, an inlet conduit for connecting said skimmer to said oil trap, and a conduit for return of said liquid to said coolant bath, a liquid pump in series with said conduits and said oil trap, said oil trap having an imperforate exterior shell and an inlet and an outlet, and including an interior, fluid-tight column extending substantially below the interface between said oil and water in said oil trap, said column communicating at its upper end with said oil trap outlet, said apparatus further comprising a submersible pump disposed in said coolant bath near the bottom thereof and adapted to transfer water and generally water density contaminants therefrom to a remote filter assembly, said filter assembly including an imperforate exterior housing, a filter inlet and a filter outlet and at least one removable filter element disposed between said filter inlet and said filter outlet, said filter element presenting a large surface area in relation to the volume of said housing, said filter element directing fluid flow through a labyrinthine path and thereafter having a blind end, said filter element being surrounded by liquid, said oil trap and said filter assembly both being accessible for removal of said at least one filter element and for disposing of said oil in said oil trap without affecting the operation of said machine.

18. An apparatus as defined in claim 17, wherein said at least one filter element comprises two filter elements connected to each other, said labyrinthine passages being arranged in series.

* * * * *